(12) United States Patent
Lee et al.

(10) Patent No.: US 12,018,425 B2
(45) Date of Patent: Jun. 25, 2024

(54) WASHING MACHINE

(71) Applicant: LG Electronics Inc., Seoul (KR)

(72) Inventors: Jeonguk Lee, Seoul (KR); Joonho Pyo, Seoul (KR); Taehee Lee, Seoul (KR)

(73) Assignee: LG Electronics Inc., Seoul (KR)

(*) Notice: Subject to any disclaimer, the term of this patent is extended or adjusted under 35 U.S.C. 154(b) by 340 days.

(21) Appl. No.: 17/419,089

(22) PCT Filed: Dec. 27, 2019

(86) PCT No.: PCT/KR2019/018550
§ 371 (c)(1),
(2) Date: Jun. 28, 2021

(87) PCT Pub. No.: WO2020/138992
PCT Pub. Date: Jul. 2, 2020

(65) Prior Publication Data
US 2022/0074104 A1 Mar. 10, 2022

(30) Foreign Application Priority Data
Dec. 28, 2018 (KR) .................. 10-2018-0172837

(51) Int. Cl.
D06F 23/04 (2006.01)
D06F 37/04 (2006.01)
(Continued)

(52) U.S. Cl.
CPC .............. *D06F 37/40* (2013.01); *D06F 23/04* (2013.01); *D06F 37/04* (2013.01); *D06F 37/12* (2013.01);
(Continued)

(58) Field of Classification Search
None
See application file for complete search history.

(56) References Cited

U.S. PATENT DOCUMENTS 6,332,343 B1    12/2001   Koketsu et al.

FOREIGN PATENT DOCUMENTS

JP    2002113285    4/2002
JP    2003019386    1/2003
(Continued)

OTHER PUBLICATIONS

International Search Report in International Appln. No. PCT/KR2019/018550, dated Apr. 21, 2020, 5 pages (with English translation).

*Primary Examiner* — Levon J Shahinian
(74) *Attorney, Agent, or Firm* — Fish & Richardson P.C.

(57) ABSTRACT

A washing machine includes a tub, a drum, a motor, a pulsator, a coupler configured to couple and decouple a driving shaft of the motor and a drying shaft of the drum, and a clutch supporting the coupler and moving in an axial direction. The clutch includes driven protrusions extending in a vertical direction. The washing machine further includes a clutch supporter having a plurality of support surfaces that are spaced apart from each other in a circumferential direction and support lower ends of the driven protrusions located between the support surfaces when the coupler is at a connection position, and guide surfaces that are located above the support surfaces in the circumferential direction and configured to interfere with the upper ends of the driven protrusions based on the clutch moving upwards from the connection position to a disconnection position to thereby rotate the driven protrusions to positions corresponding to the support surfaces.

6 Claims, 6 Drawing Sheets

(51) Int. Cl.
*D06F 37/12* (2006.01)
*D06F 37/30* (2020.01)
*D06F 37/40* (2006.01)
*F16D 1/076* (2006.01)
*F16D 1/108* (2006.01)
*F16D 11/14* (2006.01)
*F16D 27/118* (2006.01)

(52) U.S. Cl.
CPC ............ *D06F 37/304* (2013.01); *F16D 1/076* (2013.01); *F16D 1/108* (2013.01); *F16D 11/14* (2013.01); *F16D 27/118* (2013.01)

(56) References Cited

FOREIGN PATENT DOCUMENTS

| | | |
|---|---|---|
| KR | 200194920 | 6/2000 |
| KR | 101892012 | 8/2018 |

WASHING MACHINE

CROSS-REFERENCE TO RELATED APPLICATIONS

This application is a National Stage application under 35 U.S.C. § 371 of International Application No. PCT/KR2019/018550, filed on Dec. 27, 2019, which claims the benefit of Korean Patent Application No. 10-2018-0172837, filed on Dec. 28, 2018. The disclosures of the prior applications are incorporated by reference in their entirety.

BACKGROUND OF THE DISCLOSURE

Field of the Disclosure

The present disclosure relates to a washing machine having a clutch system which connects or disconnects a washing shaft to or from a drying shaft.

Related Art

A washing machine having a clutch which is operated by a solenoid and selectively connects (or couples) or disconnects (releases) a washing shaft to or from a drying shaft is well known. For example, Korean Patent Laid-Open Publication No. 2003-0023316 (hereinafter referred to as "the related art") has disclosed a structure in which a slider coupled to a drying shaft through serration is separated from a driving mechanism formed in a rotor of a washing motor while being moved upwards by the suction force of a solenoid.

However, the related art is problematic in that current should be continuously applied to the solenoid so as to maintain a state in which the slider and the rotor are separated from each other.

SUMMARY

First, the present disclosure provides a washing machine, in which a connection (or disconnection) state is maintained even if current is applied to a solenoid only when a driving shaft and a drying shaft are connected (or disconnected).

Second, the present disclosure provides a washing machine, in which a clutching system for connecting a driving shaft rotating a pulsator and a drying shaft rotating a washing tub to each other is simplified.

Third, the present disclosure provides a washing machine, in which the number of components of the clutch system is reduced, and a separate motor used to operate the clutch system and various components operated in conjunction with the motor are eliminated.

In a washing machine of the present disclosure, a coupler spline-coupled to a drying shaft couples a driving shaft to the drying shaft at a connection position, and separates the drying shaft from the driving shaft at a disconnection position raised from the connection position.

A solenoid forming a magnetic field when current is applied thereto is provided. A clutch supporting the coupler is provided to be movable upwards and downwards in an axial direction, so the clutch is moved upwards by the magnetic field of the solenoid.

A clutch supporter having a support surface which supports lower ends of driven protrusions so as to prevent the clutch from moving downwards any longer when the coupler is at the connection position is provided. A plurality of support surfaces is formed to be spaced apart from each other by a predetermined distance in a circumferential direction. The driven protrusions are located in gaps between the support surfaces when the coupler is at the connection position.

A plurality of guide surfaces is formed above the support surfaces in the circumferential direction. The guide surfaces interfere with the upper ends of the driven protrusions while the clutch moves upwards from the connection position to the disconnection position, thus rotating the driven protrusions to positions corresponding to the support surfaces.

The solenoid may include a bobbin around which coil is wound, and each of the guide surfaces may be formed on an inner circumference of the bobbin.

A bearing housing defining a space between the bearing housing and a lower surface of the water tub to accommodate a bearing which supports the drying shaft may be further provided. The clutch supporter may be coupled to a lower surface of the bearing housing.

Each of the plurality of support surfaces may include a first descending inclined surface gradually descending in a direction in which the driven protrusions are rotated, a first rotation limiting surface extending upwards from a lower end of the descending inclined surface to limit a rotating operation of each of the driven protrusions, and a second descending inclined surface gradually descending from an upper end of the first rotation limiting surface in the direction in which the driven protrusions are rotated.

A lower-end contact surface may be formed on the lower end of each of the driven protrusions to be in surface contact with the first descending inclined surface while the clutch moves downwards to the connection position.

The guide surfaces may include an ascending inclined surface coming into contact with the upper end of each of the driven protrusions and gradually ascending in the direction in which the driven protrusion is rotated, and a second rotation limiting surface extending downwards from an upper end of the ascending inclined surface to limit the rotating operation of the driven protrusion.

Advantageous Effects

A washing machine of the present disclosure is advantageous in that connection (disconnection) between a driving shaft and a drying shaft is maintained even in a state where current is not applied to a solenoid, thus reducing power consumption.

Further, a washing machine of the present disclosure is advantageous in that a separate motor used to operate a clutch system and various components operated in conjunction with the motor are eliminated, thus reducing the manufacturing cost of a product.

DESCRIPTION OF EXEMPLARY EMBODIMENTS

Figure 1:
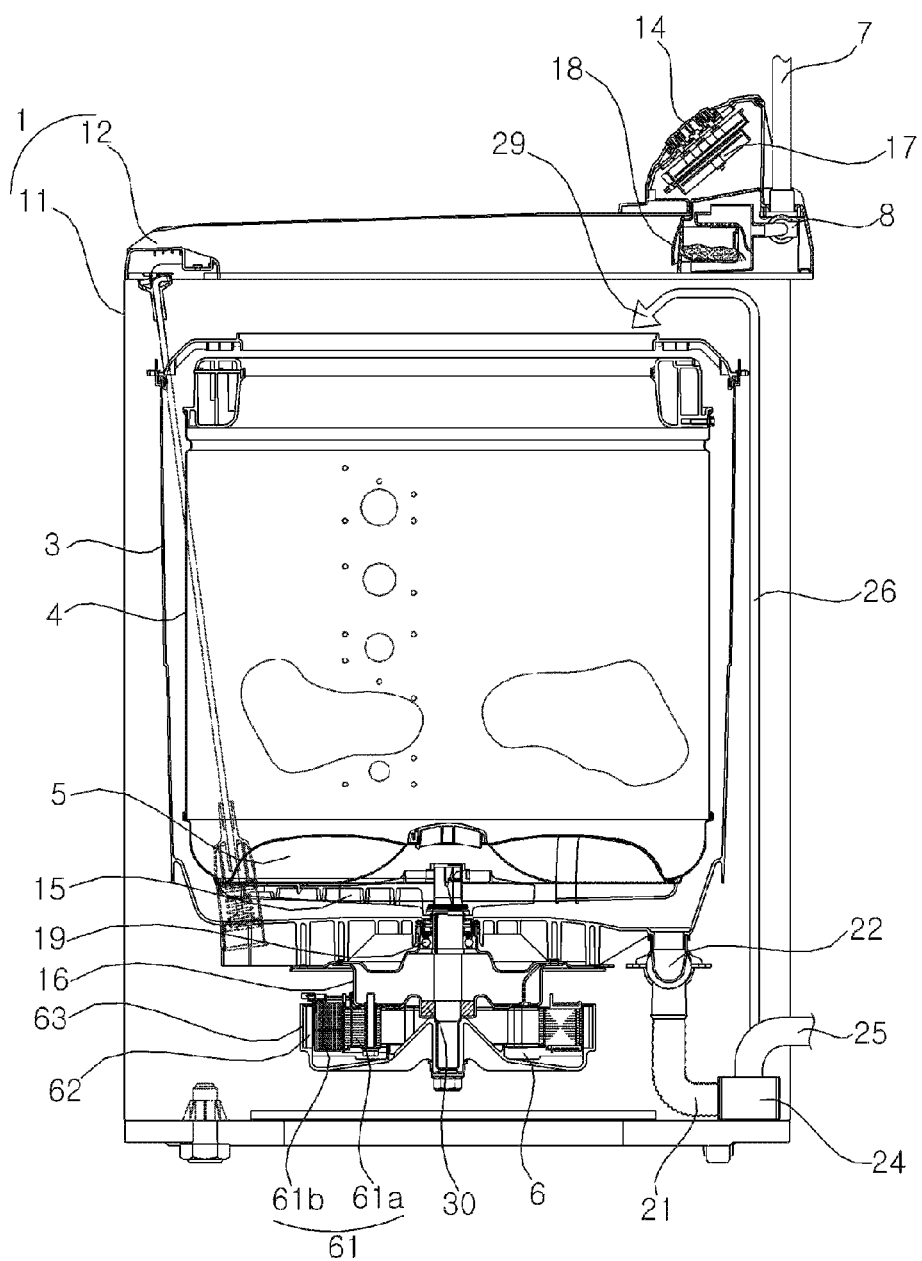
FIG. 1 is a longitudinal sectional view illustrating a washing machine in accordance with an embodiment of the present disclosure.

The above and other objectives, features, and other advantages of the present disclosure will be more clearly understood from the following detailed description when taken in conjunction with the accompanying drawings. However, the disclosure may be embodied in different forms without being limited to the embodiments set forth herein. Rather, the embodiments disclosed herein are provided to make the disclosure thorough and complete and to sufficiently convey the spirit of the present disclosure to those skilled in the art. The present disclosure is to be defined by the claims. Like reference numerals refer to like parts throughout the specification.

Figure 2:
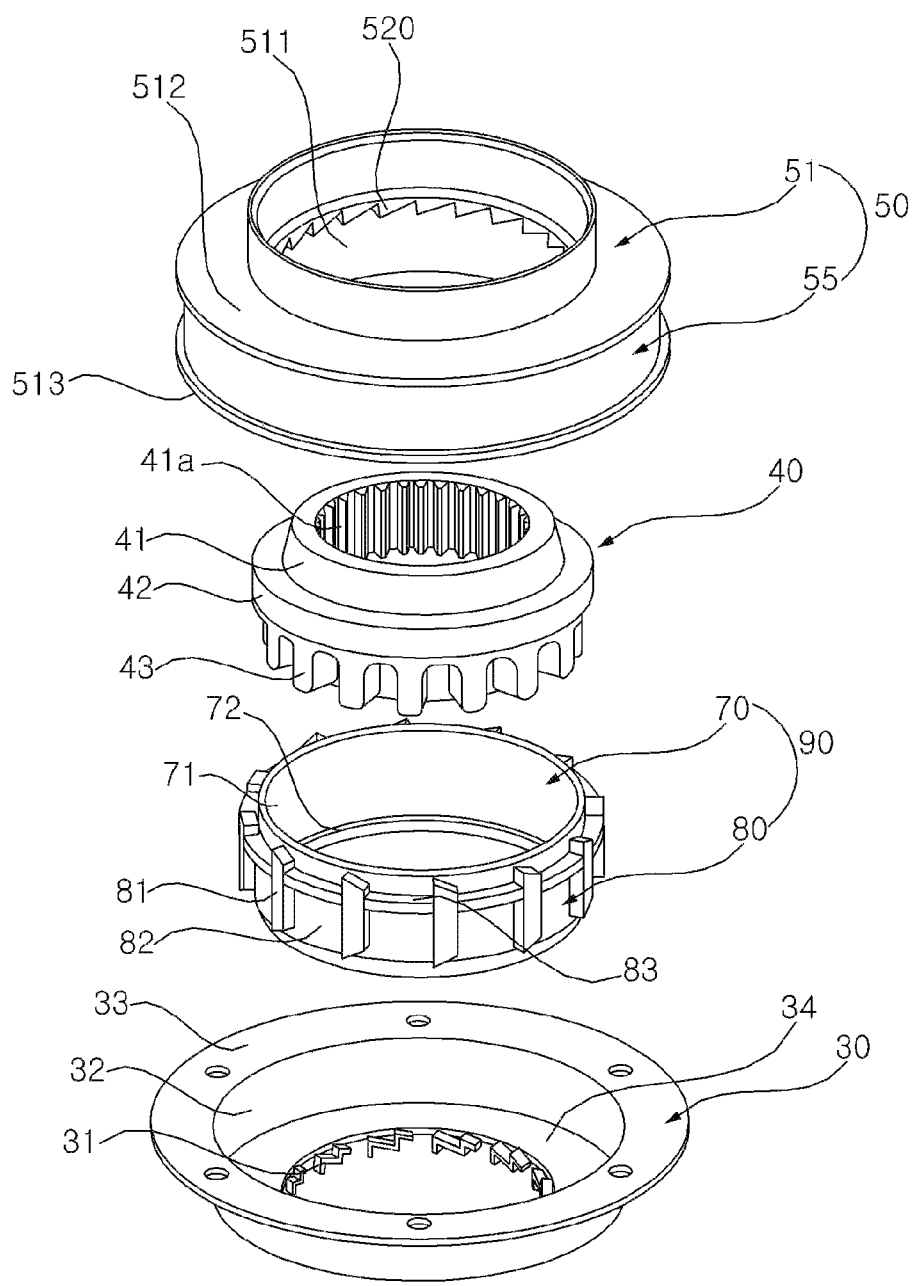
FIG. 2 is an exploded perspective view illustrating a portion of the washing machine in accordance with an embodiment of the present disclosure.
Figure 3:
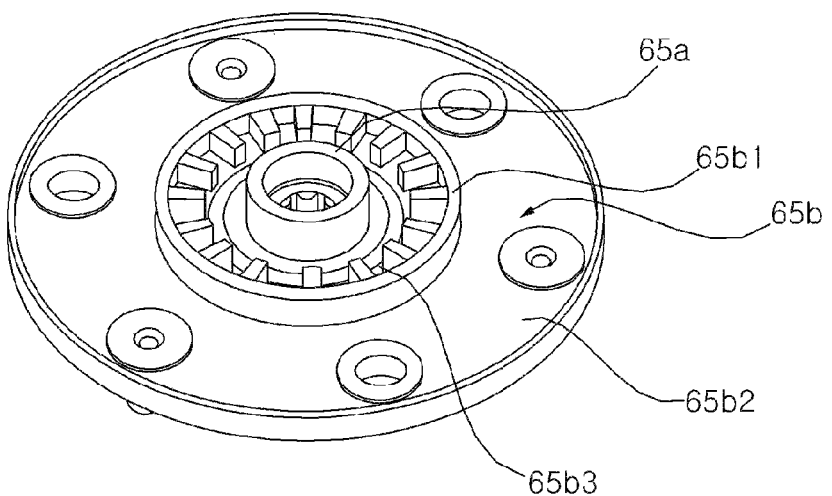
FIG. 3 is a perspective view of a rotor hub.
Figure 4:
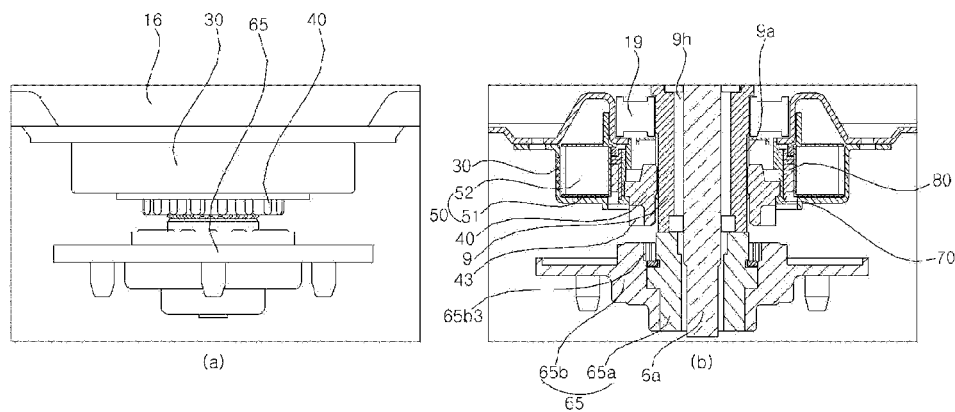
FIG. 4 illustrates a portion of the washing machine in accordance with an embodiment of the present disclosure, (a) is a view illustrating appearance in a state where a coupler is moved upwards to a disconnection position, and (b) is a longitudinal sectional view of the portion.
Figure 5:
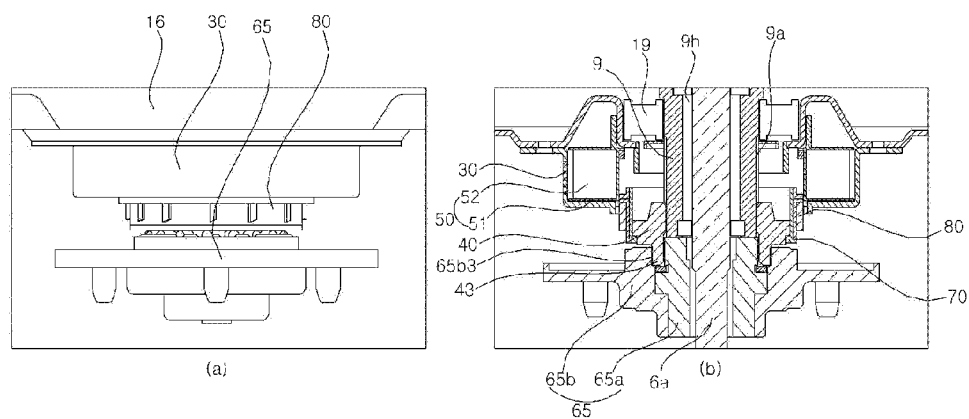
FIG. 5 illustrates a portion of the washing machine in accordance with an embodiment of the present disclosure, (a) is a view illustrating appearance in a state where the coupler is moved downwards to a connection position, and (b) is a longitudinal sectional view of the portion.
Figure 6:
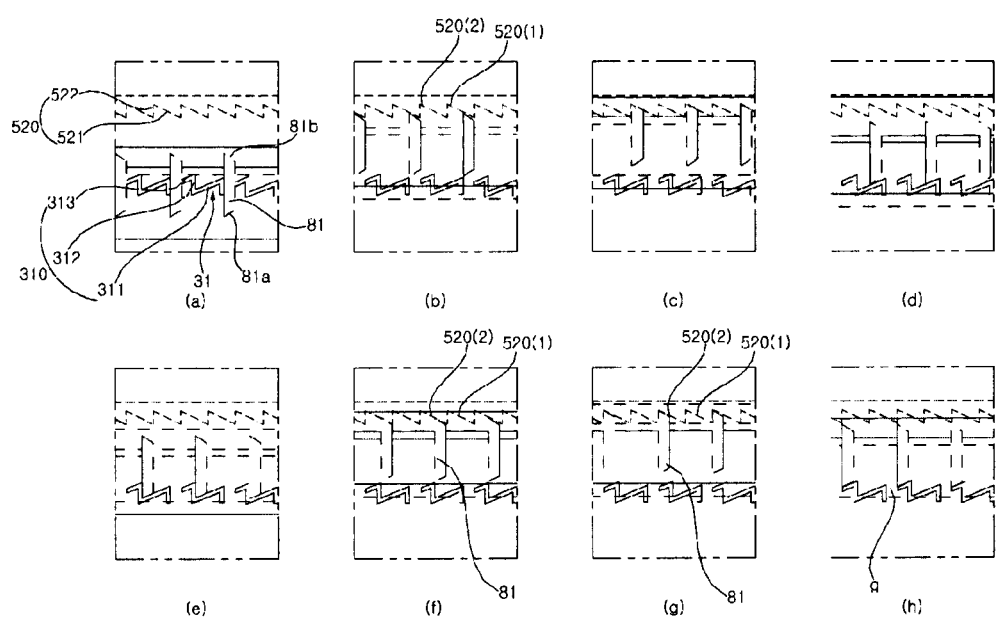
FIG. 6 illustrates the operation of a clutch sequentially, (a) illustrates a state in which the clutch is moved downwards, (b) illustrates a state in which the clutch is moved upwards so that an upper end of a driven protrusion comes into contact with a guide surface, (c) illustrates a state in which the upper end of the driven protrusion is guided along the guide surface and the clutch is rotated, (d) illustrates a state in which the clutch is moved downwards so that a lower end of the driven protrusion comes into contact with a first descending inclined surface of a support surface, (e) illustrates a state in which the lower end of the driven protrusion is guided along the support surface and the clutch is rotated, (0 illustrates a state in which the clutch is moved upwards again so that the upper end of the driven protrusion comes into contact with the guide surface, (g) illustrates a state in which the upper end of the driven protrusion is guided along the guide surface and the clutch is rotated, and (h) illustrates a state in which the clutch is moved downwards again so that the lower end of the driven protrusion comes into contact with a second descending inclined surface.

FIG. 1 is a longitudinal sectional view illustrating a washing machine in accordance with an embodiment of the present disclosure. FIG. 2 is an exploded perspective view illustrating a portion of the washing machine in accordance with an embodiment of the present disclosure. FIG. 3 is a perspective view of a rotor hub. FIG. 4 illustrates a portion of the washing machine in accordance with an embodiment of the present disclosure, (a) is a view illustrating appearance in a state where a coupler is moved upwards to a disconnection position, and (b) is a longitudinal sectional view of the portion. FIG. 5 illustrates a portion of the washing machine in accordance with an embodiment of the present disclosure, (a) is a view illustrating appearance in a state where the coupler is moved downwards to a connection position, and (b) is a longitudinal sectional view of the portion. FIG. 6 illustrates the operation of a clutch sequentially, (a) illustrates a state in which the clutch is moved downwards, (b) illustrates a state in which the clutch is moved upwards so that an upper end of a driven protrusion comes into contact with a guide surface, (c) illustrates a state in which the upper end of the driven protrusion is guided along the guide surface and the clutch is rotated, (d) illustrates a state in which the clutch is moved downwards so that a lower end of the driven protrusion comes into contact with a first descending inclined surface of a support surface, (e) illustrates a state in which the lower end of the driven protrusion is guided along the support surface and the clutch is rotated, (f) illustrates a state in which the clutch is moved upwards again so that the upper end of the driven protrusion comes into contact with the guide surface, (g) illustrates a state in which the upper end of the driven protrusion is guided along the guide surface and the clutch is rotated, and (h) illustrates a state in which the clutch is moved downwards again so that the lower end of the driven protrusion comes into contact with a second descending inclined surface.

Referring to FIGS. 1 to 6, a casing 1 defines the appearance of a washing machine, and defines a space in which a water tub 3 is accommodated. The casing 1 may include a cabinet 11 which is open at an upper surface thereof, and a top cover 12 which is coupled to the open upper surface of the cabinet 11 and has on a central portion thereof an inlet through which laundry is put. A door (not shown) may be rotatably coupled to the top cover 12 to open or close the inlet. A control panel 14 may be provided on the top cover 12. The control panel 14 may be provided with an input unit (e.g., button, dial, touch pad, etc.) through which a user inputs various control commands to control the operation of the washing machine, and a display unit (e.g., LCD, LED display, etc.) which visually displays the operating state of the washing machine.

A water supply pipe 7 which guides water supplied from an external water source, such as a faucet, and a water supply valve 8 which regulates the water supply pipe 7 may be provided. The water supply valve 8 may be controlled by a control unit 17. The control unit 17 may control the operation of the washing machine as well as the water supply valve 8. The control unit 17 may include a microprocessor having a memory for storing data. Hereinafter, unless otherwise stated, it is to be understood that electric/electronic components constituting the washing machine are controlled by the control unit 17.

A drawer 18 containing detergent may be received in the top cover 12 to be taken out therefrom. After water supplied through the water supply valve 8 is mixed with the detergent while passing through the drawer 18, the water is discharged to the water tub 3 or the washing tub 4.

A discharge pipe 21 discharging water from the water tub 3 and a drain valve 22 regulating the discharge pipe 21 may be provided. Water discharged through the discharge pipe 21 may be pumped by a drain pump 24 to be discharged through a drain pipe 25 to an outside of the washing machine.

The washing tub 4 receives laundry therein, and is rotated about a vertical axis in the water tub 3. A pulsator 5 is rotatably provided in the washing tub 4. The pulsator 5 is connected to a pulsator shaft 31. A plurality of perforations may be formed in the washing tub 4 so that water may be exchanged between the water tub 3 and the washing tub 4.

A driving shaft 6a serves to rotate the pulsator 5, and is rotated by a motor 6. The driving shaft 6a is connected to a rotor 63 of the motor 6. The driving shaft 6a may be directed connected to the pulsator 5 (i.e., a rotation ratio of the driving shaft to the pulsator is 1:1). However, without being limited thereto, a planetary gear train (not shown) may be further provided to convert the output of the driving shaft 6a into a predetermined speed ratio or torque ratio and then rotate the pulsator.

A drying shaft 9 is connected to the washing tub 2, and has a tubular shape having a hollow portion 9h through which the driving shaft 4 passes. A hub base 15 may be provided under the washing tub 2 to be coupled to a bottom of the washing tub 2. The drying shaft 9 may be coupled to the hub base 15.

A bearing housing 16 may be disposed under the water tub 1. The bearing housing 16 may be coupled to the lower surface of the water tub 1. A bearing 19 may be provided in the bearing housing 16 to support the drying shaft 9.

The bearing housing 16 is coupled to the lower surface of the water tub 3 by a fastening member such as a screw or a bolt, thus defining a space between the bearing housing and the lower surface of the water tub 3 to accommodate the bearing 19. An opening is formed in a bottom of the bearing housing 16 to allow the drying shaft 9 to pass therethrough.

The motor 6 may be an outer rotor type of BLDC (Brushless Direct Current) motor. However, the type of the motor 6 is not limited thereto. For example, the motor 6 may be an inner rotor type, an AC motor such as an induction motor or a shaded pole motor, or various other types of motors which are known to those skilled in the art.

The motor 6 may include a stator 61 in which a stator coil 61b is wound around a stator core 61a, and a rotor frame 63 which fixes a plurality of permanent magnets 62 spaced apart from each other in a circumferential direction. A rotor hub 65 may be further provided to connect the central portion of the rotor frame 63 to the driving shaft 6a. The rotor frame 63 is rotated by the electromagnetic force acting between a plurality of permanent magnets 62 and the stator 61, and the driving shaft 6a is also rotated.

Meanwhile, the rotor hub 65 may include a rotor bush 65a which is coupled to the driving shaft 6a, and a coupling flange 65b which couples the rotor bush 65a to the central portion of the rotor frame 63. The coupling flange 65b may include a tubular flange body 65b1 into which the rotor bush 65a is inserted, and a flange part 65b2 which extends outwards from the flange body 65b1 to be coupled to the rotor frame 63 by a fastening member such as a screw or a bolt. In particular, mesh grooves 65b3 engaging with the coupler 40 may be circumferentially formed on the inner circumference of the flange body 65b1.

The coupler 40 is spline-coupled to the drying shaft 9. Here, the term "spline-coupling" means that a spline protrusion 41a such as a key or a tooth extending in an axial direction is formed on either of the drying shaft 9 or the coupler 40, and a spline groove 9a (see FIGS. 4 and 5) meshing with the spline protrusion 41a is formed in a remaining one, so the spline protrusion 41a engages with the spline groove 9a. When the spline protrusion 41a has a triangular cross-section, this may be referred to as serration. When the coupler 40 is rotated by the engagement between the spline groove 9a and the spline protrusion 41a, the drying shaft 9 is also rotated.

The engagement (or mesh) between the spline groove 9a and the spline protrusion 41a allows the coupler 40 to move upwards and downwards (or move axially). The coupler 40 couples (connects) the driving shaft 6a to the drying shaft 9 at a connection position (see FIG. 5), and disconnects the drying shaft from the driving shaft 6a at a disconnection position (see FIG. 6) where the coupler moves upwards from the connection position.

The coupler 40 is moved upwards from the connection position to the disconnection position by a solenoid 50 and a clutch (plunger or core). Since the clutch 90 has a cylindrical shape, the clutch may be fitted over the drying shaft 9. The coupler 40 is supported by the clutch 90. Thus, as the clutch 90 moves upwards and downwards, the coupler 40 is also moved upwards and down.

The solenoid 50 may be provided to form a magnetic field when current is applied. The solenoid 50 may be disposed inside a clutch supporter 30 which will be described later. The solenoid 50 may include a bobbin 51 around which coil (not shown) is wound. A hollow portion is formed in the bobbin 51 to allow the drying shaft 9 to pass therethrough, and the coil is wound on the outer circumference of the bobbin 51.

The coil may be surrounded with resin 55 of a flame-retardant material. The bobbin 51 may include a cylindrical bobbin body 511 around which the coil is wound, a top plate 512 which extends outwards from the bobbin body 511, and a bottom plate 513 which is provided on a lower end of the bobbin body 511 to extend outwards.

The clutch 90 supports the coupler 40 and is disposed to be movable upwards and downwards in an axial direction, so the clutch is moved upwards by the magnetic field formed by the solenoid 50. The clutch 90 is provided with a driven protrusion 81 which extends long in a vertical direction. A plurality of driven protrusions 81 may be disposed on the outer circumference of the clutch 90 in a circumferential direction.

In detail, the clutch 90 may include an armature 70 which has a tubular (cylindrical) shape to be fitted over the drying shaft 9, and a cylindrical clutching actuator 80 which is secured to an outside of the armature 70 to move along with the armature 70.

The armature 70 may be made of a ferromagnetic material. The armature 70 may include a cylindrical core sidewall 71, and a support rim 72 extending radially inwards from a lower end of the core sidewall 71. The coupler 40 may be supported by the support rim 72.

The coupler 40 may include a tubular coupler body 41 having a spline groove 9a formed on an inner circumference thereof, an annular locking rib 42 protruding from an outer circumference of the coupler body 41, and a plurality of teeth 43 which protrude downwards from the lower surface of the locking rib 42 and are circumferentially disposed on the circumference of the coupler body 41.

The lower end of the locking rib 42 may be seated (or supported) on the support rim 72 of the armature 70. When the coupler 40 is at the connection position, teeth 41a may engage with the mesh grooves 65b3 of the coupling flange 65b.

The clutching actuator 80 may include a cylindrical actuator body 82, and a plurality of driven protrusions 81 may protrude from the outer circumference of the actuator body 82. The clutching actuator may further include an annular stopper 83 which protrudes from the outer circumference of the actuator body 82 and extends in a circumferential direction.

In order to prevent the clutch 90 from moving downwards any longer when the coupler 40 is at the connection position, a clutch supporter 30 having a support surface 310 which supports the lower end of each driven protrusion 81 is provided. A plurality of support surfaces 310 is formed to be spaced apart from each other by a predetermined distance in the circumferential direction. When the coupler 40 is at the connection position, the driven protrusions 81 are located in gaps between the support surfaces (see FIG. 6 (a)).

The clutch supporter 30 may be coupled to the lower surface of the bearing housing 16. The clutch supporter 30 may include a cylindrical supporter body 32 which surrounds the circumference of the clutch 90, a ring-shaped supporter flange 33 which extends radially outwards from the upper end of the supporter body 32, and a ring-shaped supporter base 34 which extends radially inwards from the lower end of the supporter body 32 and has in a center thereof an opening through which the drying shaft 9 passes.

A plurality of support ribs 31 may be disposed around the opening of the supporter base 34 to be spaced apart from each other in the circumferential direction, and the support surfaces 310 may be formed on the support rib 31.

The support surface 310 may include a first descending inclined surface 311, a first rotation limiting surface 312, and a second descending inclined surface 313. The first descending inclined surface 311 may gradually descend in a direction D in which the driven protrusions 81 are rotated. The first rotation limiting surface 312 may extend upwards from the lower end of the first descending inclined surface 311. Preferably, the first rotation limiting surface 312 may extend upwards in a vertical direction from the lower end of the first descending inclined surface 311. The second descending inclined surface 313 may gradually descend from the upper end of the first rotation limiting surface 312 in the direction D in which the driven protrusions 81 are rotated.

A lower-end contact surface 81a may be formed on the lower end of each driven protrusion 81 to be in surface contact with the first descending inclined surface 311 while the clutch 90 moves downwards to the connection position.

A guide surface 520 may be formed above each support surface 310. A plurality of guide surfaces 520 may be formed in the circumferential direction. While the clutch 90 moves upwards from the connection position to the disconnection position, the upper end of each driven protrusion 81 interferes with the guide surface 520 so that the driven protrusion 81 is rotated to a position corresponding to the support surface 310. The guide surface 520 may be formed on the inner circumference of the bobbin 51.

The guide surface 520 may include an ascending inclined surface 521 and a second rotation limiting surface 522. The ascending inclined surface 521 may be in contact with the upper end of each driven protrusion 81, and may gradually ascend in the rotating direction D of the driven protrusion 81.

The second rotation limiting surface 522 may extend downwards from the upper end of the ascending inclined surface 521 to limit the rotating operation of the driven protrusion 81. Preferably, the second rotation limiting surface 522 extends downwards in the vertical direction from the upper end of the ascending inclined surface 521.

An upper-end contact surface 81b may be formed on the upper end of each driven protrusion 81 to be in surface contact with the ascending inclined surface 521 while the clutch 90 moves upwards the connection position.

Hereinafter, the operation of the clutch 90 will be described with reference to FIG. 6.

When the clutch 90 is at the connection position (see FIG. 6(a)), the driven protrusion 81 is located in a gap between the support ribs (or the support surfaces 310). At this time, the stopper 83 formed on the clutching actuator 80 is supported by the support rib 31 provided thereunder, so the clutch 90 is not moved downwards any longer. At the connection position, the coupler 40 and the rotor hub 65 engage (or mesh) with each other, so the driving shaft 6a and the drying shaft 9 are coupled to each other. Thus, when the motor 6 is operated, the pulsator 5 is rotated along with the washing tub 4.

If current is applied to the coil of the solenoid 50 under the control of the control unit 17, the armature 70 is moved upwards, and thus the clutching actuator 80 is also moved upwards. While the clutching actuator 80 is moved upwards as such, the upper end of the driven protrusion 81 comes into contact with the ascending inclined surface 521 of a first guide surface 520(1) (see FIG. 6(b)), and the upper end of the driven protrusion 81 slides along the ascending inclined surface 521. This sliding is performed until the driven protrusion 81 comes into contact with the second rotation limiting surface 522 and thus the clutching actuator 80 is not rotated any longer. At this time, the driven protrusion 81 is at a point where it is located above the support surface 310 to be spaced apart therefrom (see FIG. 6(c)).

Thereafter, if the current applied to the coil of the solenoid 50 is cut off under the control of the control unit 17, the clutching actuator 80 is moved downwards along with the armature 70. During the downward movement, the lower end of the driven protrusion 81 comes into contact with the first descending inclined surface 311 (see FIG. 6 (d)).

The lower end of the driven protrusion 81 slides along the first descending inclined surface 311. The sliding is performed until the driven protrusion 81 comes into contact with the first rotation limiting surface 312 and thus the clutching actuator 80 is not rotated any longer. At this time, the driven protrusion 81 is supported by the first descending inclined surface 311 located thereunder. At this time, the position of the clutch 90 is the disconnection position (see FIG. 6(e)). Since the clutch 90 is supported by the first descending inclined surface 311 to maintain its position when the clutch is at the disconnection position, the control unit 17 may cut off the current applied to the coil of the solenoid 50 an thus may reduce power consumption.

Since the coupler 40 is separated from the rotor hub 65 at the disconnection position, only the pulsator 5 is rotated by the driving shaft 6a when the motor 6 is operated.

If current is applied to the coil of the solenoid 50 again under the control of the control unit 17, the armature 70 is moved upwards, and thus the clutching actuator 80 is also moved upwards. While the clutching actuator 80 moves upwards, the upper end of the driven protrusion 81 comes into contact with the ascending inclined surface 521 of the second guide surface 520(2) (see FIG. 6(f)), and the upper end of the driven protrusion 81 slides along the ascending inclined surface 521. This sliding is performed until the driven protrusion 81 comes into contact with the second rotation limiting surface 522 and thus the clutching actuator 80 is not rotated any longer (see FIG. 6(g)).

Subsequently, if the current applied to the coil of the solenoid 50 is cut off under the control of the control unit 17, the clutching actuator 80 is moved downwards along with the armature 70. During the downward movement, the lower end of the driven protrusion 81 comes into contact with the second descending inclined surface 313 (see FIG. 6 (h)). When the lower end of the driven protrusion 81 slides along the second descending inclined surface 313 to rotate the clutch 90, and the lower end of the driven protrusion 81 passes through the lower end of the second descending inclined surface 313 and reaches the gap g, the clutch 90 returns to the connection position (see FIG. 6(a)).

Although the present disclosure has been described with reference to specific embodiments shown in the drawings, it is apparent to those skilled in the art that the present disclosure may be changed and modified in various ways without departing from the scope of the present disclosure, which is described in the following claims.

What is claimed is:
1. A washing machine comprising:
a water tub containing water therein;
a washing tub provided in the water tub to be rotated by a drying shaft;
a motor rotating a driving shaft;

a pulsator disposed in the washing tub, and rotated by a rotating force transmitted from the driving shaft;

a coupler spline-coupled to the drying shaft, coupling the driving shaft to the drying shaft at a connection position, and separating the drying shaft from the driving shaft at a disconnection position raised from the connection position;

a solenoid forming a magnetic field when current is applied thereto;

a clutch supporting the coupler and disposed to be movable upwards and downwards in an axial direction, so the clutch is moved upwards by the magnetic field, the clutch comprising driven protrusions which extend long in a vertical direction;

a clutch supporter having a plurality of support surfaces which are formed to be spaced apart from each other by a predetermined distance in a circumferential direction and support lower ends of the driven protrusions so as to prevent the clutch from moving downwards any longer when the coupler is at the connection position, the driven protrusions being located in gaps between the support surfaces when the coupler is at the connection position; and a plurality of guide surfaces formed above the support surfaces in the circumferential direction, and interfering with upper ends of the driven protrusions while the clutch moves upwards from the connection position to the disconnection position, thus rotating the driven protrusions to positions corresponding to the support surfaces.

2. The washing machine of claim 1, wherein the solenoid comprises a bobbin around which coil is wound, and each of the guide surfaces is formed on an inner circumference of the bobbin.

3. The washing machine of claim 2, further comprising:
a bearing housing defining a space between the bearing housing and a lower surface of the water tub to accommodate a bearing which supports the drying shaft, and
wherein the clutch supporter is coupled to a lower surface of the bearing housing.

4. The washing machine of claim 1, wherein each of the plurality of support surfaces comprises:
a first descending inclined surface gradually descending in a direction in which the driven protrusions are rotated;
a first rotation limiting surface extending upwards from a lower end of the first descending inclined surface to limit a rotating operation of each of the driven protrusions; and
a second descending inclined surface gradually descending from an upper end of the first rotation limiting surface in the direction in which the driven protrusions are rotated.

5. The washing machine of claim 4, wherein a lower-end contact surface is formed on the lower end of each of the driven protrusions to be in surface contact with the first descending inclined surface while the clutch moves downwards to the connection position.

6. The washing machine of claim 1, wherein the guide surfaces comprise:
an ascending inclined surface coming into contact with the upper end of each of the driven protrusions, and gradually ascending in a direction in which the driven protrusion is rotated; and
a second rotation limiting surface extending downwards from an upper end of the ascending inclined surface to limit a rotating operation of the driven protrusion.

* * * * *